(12) United States Patent
Rosenthal

(10) Patent No.: US 12,013,760 B2
(45) Date of Patent: Jun. 18, 2024

(54) METHODS AND SYSTEMS FOR RECOGNIZING UNINTENDED FILE SYSTEM CHANGES

(71) Applicant: Centurion Holdings I, LLC, Arnold, MO (US)

(72) Inventor: Jeffrey Rosenthal, Tampa, FL (US)

(73) Assignee: Centurion Holdings I, LLC, Arnold, MO (US)

( * ) Notice: Subject to any disclaimer, the term of this patent is extended or adjusted under 35 U.S.C. 154(b) by 485 days.

(21) Appl. No.: 16/923,747

(22) Filed: Jul. 8, 2020

(65) Prior Publication Data

US 2021/0011807 A1    Jan. 14, 2021

Related U.S. Application Data

(60) Provisional application No. 62/872,276, filed on Jul. 10, 2019.

(51) Int. Cl.
*G06F 11/14* (2006.01)
*G06F 9/54* (2006.01)
(Continued)

(52) U.S. Cl.
CPC .......... *G06F 11/1435* (2013.01); *G06F 9/545* (2013.01); *G06F 11/1448* (2013.01); *G06F 11/1451* (2013.01); *G06F 11/1469* (2013.01); *G06F 11/3034* (2013.01); *G06F 16/122* (2019.01); *G06F 16/1734* (2019.01);
(Continued)

(58) Field of Classification Search
CPC .............. G06F 11/1435; G06F 16/122; G06F 16/1734; G06F 9/545; G06F 11/1448; G06F 11/1451; G06F 11/1469; G06F 11/3034; G06F 21/554; G06F 21/568;
(Continued)

(56) References Cited

U.S. PATENT DOCUMENTS

| 2012/0130956 A1* | 5/2012 | Caputo ............... G06F 11/1469 707/E17.005 |
| 2014/0149701 A1* | 5/2014 | Osada ................... G06F 3/0619 711/162 |

(Continued)

FOREIGN PATENT DOCUMENTS

WO    WO-2018111271 A1 *   6/2018   ............. G06F 21/12

*Primary Examiner* — Richard A McCoy
(74) *Attorney, Agent, or Firm* — Hovey Williams LLP

(57) ABSTRACT

A computing system includes a memory device, a persistent storage device, and a processor. The persistent storage device includes a filesystem having filesystem objects and a protection system stored thereon. The protection system includes a filesystem minifilter driver and a protection service. The minifilter driver intercepts an input/output (I/O) event directed to a target filesystem object and extracts system event metadata from the I/O event. The system event metadata includes an identifier of the target filesystem object. The system event metadata is transmitted to the protection service and recorded in a record file. A backup copy of the target filesystem object created. The I/O event is released after recordation of the system event metadata and creation of the backup copy, thereby enabling the I/O event to be performed on the target filesystem object. During a system restore operation, the target filesystem object is replaced with the backup copy.

18 Claims, 8 Drawing Sheets

(51) Int. Cl.
*G06F 11/30* (2006.01)
*G06F 16/11* (2019.01)
*G06F 16/17* (2019.01)
*G06F 21/55* (2013.01)
*G06F 21/56* (2013.01)
*G06F 21/60* (2013.01)

(52) U.S. Cl.
CPC .......... *G06F 21/554* (2013.01); *G06F 21/568* (2013.01); *G06F 21/602* (2013.01); *G06F 2201/80* (2013.01); *G06F 2201/86* (2013.01); *G06F 2221/033* (2013.01)

(58) Field of Classification Search
CPC ............... G06F 21/602; G06F 2201/80; G06F 2201/86; G06F 2221/033
See application file for complete search history.

(56) References Cited

U.S. PATENT DOCUMENTS

2016/0371292 A1* 12/2016 Narasimha .......... H03M 7/3091
2018/0351969 A1* 12/2018 MacLeod .............. G06F 21/554
2019/0108341 A1* 4/2019 Bedhapudi .......... G06F 16/1752

\* cited by examiner

METHODS AND SYSTEMS FOR RECOGNIZING UNINTENDED FILE SYSTEM CHANGES

CROSS-REFERENCE TO RELATED APPLICATIONS

1. Priority Application

The present application claims priority from U.S. Provisional Patent Application No. 62/872,276, filed Jul. 10, 2019, and entitled METHODS AND SYSTEMS FOR RECOGNIZING UNINTENDED FILE SYSTEM CHANGES, the entire disclosure of which is hereby incorporated by reference herein.

1. Contemporaneously Filed Application

The present application is filed contemporaneously with U.S. patent application Ser. No. 16/923,785, entitled METHODS AND SYSTEMS FOR RECOGNIZING UNINTENDED FILE SYSTEM CHANGES, filed Jul. 8, 2020, the entire disclosure of which is hereby incorporated by reference herein.

FIELD OF THE DISCLOSURE

This disclosure relates to systems and methods for protecting filesystem data files, and more particularly, to systems and methods for protecting data files from unauthorized changes in data and attributes in a program or in a desired configuration.

BACKGROUND

Computers, computer networks, and the Internet are pervasive in today's society. Individuals, businesses, and other entities rely on the Internet to perform various electronic transactions, applications, and services. The Internet provides an efficient, cost effective, and valuable platform for such transactions, applications, and services. However, computer security and/or data breaches often cause damage to an individual's or a business's data files. For example, theft or corruption of data is possible if a computer or computer network is not protected against such security and/or data breaches. Once data is corrupted, it can take a large amount of time, effort, and expense to correct the problem.

In addition to security and/or data breaches, computers may become corrupted by a computer virus that is unknowingly downloaded from the Internet, transferred from another computer, copied from portable media, etc. A computer virus is a program designed to corrupt or change the computer without the knowledge of the operator or user of the computer. Once a computer virus is loaded on a computer, the virus may spread to other computers on a computer network. Examples of a virus include malware, spyware, key loggers, adware, malicious scripts, ransomware, Trojan horses, and the like. In some instances, a virus may be maliciously implemented by an individual intent to cause destruction to a computer system or network.

Several known security technologies for attempting to prevent unauthorized changes to data, programs, or configurations have been developed. One method is to provide a "firewall" to protect a computer network. The firewall establishes a software barrier between a trusted and secured computer and/or computer network and another computer and/or computer network, such as the Internet. Although firewalls are used to protect computers and computer networks, firewalls are still subject to being defeated by an attack. Once the firewall is defeated, it is possible that a computer on the network may become infected, which in turn may infect the other computers on the network. Another method used to protect a computer is an anti-virus software application that analyzes software and data files to determine if a virus is present or hidden therein. Anti-virus software typically has a set of virus characteristics that the software searches for to determine if a virus is present. However, one problem with anti-virus software is that a new virus that has not had its characteristics registered or recorded yet will be able to circumvent the anti-virus software. If the anti-virus software is not continuously updated with a new set of virus characteristics, then a virus may not be detected. Yet another solution has been to impose security features that require user authorization or approval. For example, a password or a physical key may be required to make a change to data, programs, or configurations. Unfortunately, this solution can be problematic and burdensome to the computer user. For example, the password may be forgotten and/or the physical key may be misplaced.

As is known, hacking techniques and malware programs are continually evolving and adapting to these security technologies. Even with appropriate security systems in place, malware may still bypass existing security technologies using, for example, phishing attacks directed to the computer user. These attacks attempt to exploit the computer user to gain access to computers and computer networks.

Furthermore, information technology (IT) personnel are often confronted with computer problems or issues on a daily basis. Computer users may make unauthorized or unwanted changes to their computer systems in which the IT personnel must resolve. The IT personnel may need to upgrade one or more computers with new software versions or patches. If the software upgrade fails or has a problem, the IT personnel may need to remove the upgrade in an attempt to return to an initial, known setting.

Therefore, it would be advantageous to have systems and methods that protect computer data files from changes in data, in a program, or in a desired configuration. For example, it would be desirable to have systems and methods that enable data files to be restored to an initial condition or configuration. In addition, it would be advantageous to have systems and methods for preventing data being written to a protected zone, portion, or session of a hard drive. With the protection provided by the present systems and methods of this disclosure, a computer user can safely connect to a network, such as the Internet, download files, expose the computer to viruses such as malware, spyware, key loggers, worms, adware, ransomware, and Trojan horses, experiment with different system settings, and otherwise expose the computer's configuration to change without fear of permanent damage to the computer data.

BRIEF DESCRIPTION

This brief description is not intended to identify essential features of the present invention and is not intended to be used to limit the scope of the claims. These and other aspects of the present invention are described below in greater detail.

In one aspect, a computing system is provided. The computing system includes a memory device, a persistent storage device, and a processor communicatively coupled to the memory device and the persistent storage device. The persistent storage device includes a filesystem defined therein. A plurality of filesystem objects and a protection system are stored in the filesystem. The protection system includes a filesystem minifilter driver and a protection service. The processor is programmed to intercept, via the filesystem minifilter driver, an input/output (I/O) event directed to a target filesystem object of the plurality of filesystem objects. The processor is also programmed to extract, via the filesystem minifilter driver, system event metadata from the I/O event. The system event metadata includes an identifier of the target filesystem object. In addition, the processor is programmed to transmit the system event metadata to the protection service and record, via the protection service, the system event metadata in a record file. Moreover, the processor is programmed to create, via the protection service, a backup copy of the target filesystem object. Furthermore, the processor is programmed to release, via the filesystem minifilter driver, the I/O event, thereby enabling the I/O event to be performed on the target filesystem object. Additionally, the processor is programmed to replace, during a system restore operation and via the protection service, the target filesystem object with the backup copy.

In another aspect, a method is provided. The method includes starting a filesystem minifilter driver during a booting sequence of a computing system. The filesystem minifilter driver is configured to operate in an operating system kernel of the computing system. The method also includes monitoring, via the filesystem minifilter driver, an input/output (I/O) event directed to a target filesystem object stored in a filesystem of a persistent storage device of the computing system. The target filesystem object is one of a plurality of filesystem objects stored in the filesystem. The method includes intercepting, via the filesystem minifilter driver, the I/O event and extracting system event metadata from the I/O event. The system event metadata includes an identifier of the target filesystem object. Furthermore, the method includes transmitting the system event metadata to a protection service operating on the computing system and recording, via the protection service, the system event metadata in a record file. moreover, the method includes creating, via the protection service, a backup copy of the target filesystem object. The method also includes releasing, via the filesystem minifilter driver, the I/O event to enable the I/O event to be performed on the target filesystem object. Additionally, the method includes replacing, during a system restore operation and via the protection service, the target filesystem object with the backup copy.

In light of the foregoing comments, it will be recognized that the present disclosure provides systems and methods for protecting data files from unauthorized and unwanted changes in data, in a program, or in a desired configuration. The present disclosure provides systems and methods for protecting data files that allows a computer or a computer network to be safely connected to another network such as the Internet.

The present disclosure is directed to systems and methods for protecting data files that allows a computer or a computer network to be safely exposed to viruses such as malware, spyware, key loggers, worms, adware, ransomware, and Trojan horses. The present disclosure provides systems and methods for protecting data files that allows an information technology professional to experiment with different system settings, upgrade a software version, or change the configuration of a computer system or the computer network without fear of permanent damage to the computer system or the computer network.

The present disclosure is also directed to systems and methods for protecting data files that handle and store data in a computer by establishing a protected storage repository having different levels of write protection to prevent attempted changes to data stored in the protected storage repository.

The present disclosure further provides systems and methods for protecting data files that are capable of restoring changed data files to an initial state. The present disclosure is also directed to systems and methods for protecting data files by eliminating the need to reimage a hard drive.

The present disclosure is also directed to systems and methods for protecting data files that allows information technology professionals to manage various computers or a network of computers such as lab computers or computers in a school, library, corporate, or government environment.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. Each figure depicts an embodiment of a particular aspect of the disclosed systems and methods, and each of the figures is intended to accord with a possible embodiment thereof. Further, wherever possible, the following description refers to the reference numerals included in the following figures, in which features depicted in multiple figures are designated with consistent reference numerals. The present embodiments are not limited to the precise arrangements and instrumentalities shown in the figures.

The features, aspects, and advantages of the present disclosure will become better understood when the following detailed description is read with reference to the accompanying drawings, wherein.

Figure 1:
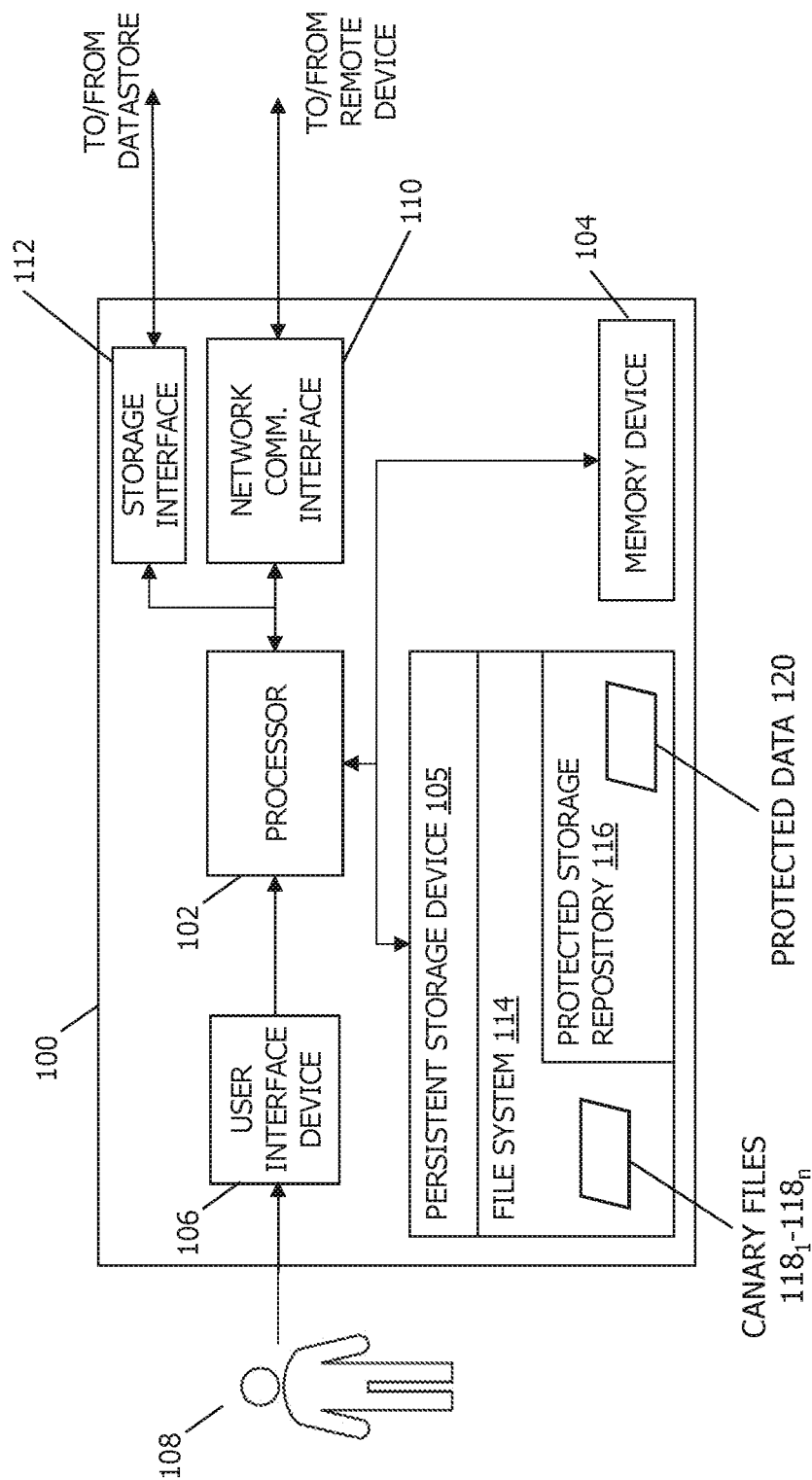
FIG. 1 is a block diagram of an example user computing system, in accordance with one embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. The drawings are not necessarily to scale, emphasis instead being placed upon clearly illustrating the principles of the embodiments of this disclosure.

DETAILED DESCRIPTION

The following detailed description of embodiments of the disclosure references the accompanying drawings. The embodiments are intended to describe aspects of the disclosure in sufficient detail to enable those skilled in the art to practice the disclosure. Other embodiments can be utilized, and changes can be made without departing from the scope of the claims. The following detailed description is, therefore, not to be taken in a limiting sense. The scope of the present disclosure is defined only by the appended claims, along with the full scope of equivalents to which such claims are entitled.

Embodiments of the present technology relate to systems, computer-readable media, and computer-implemented methods for protecting computer data against unauthorized change. In particular, the systems, computer-readable media, and computer-implemented methods monitor input/output (I/O) requests from processes running on a computing system, record the operations of the I/O requests, and restore the data modified by the I/O requests to an initial state during a system restore operation. Embodiments of the present technology provide increased security of data for users accessing computing systems and prevent hackers and/or malicious processes from changing and/or corrupting data files on the computing systems.

According to one embodiment of the disclosure, a filesystem minifilter driver monitors and intercepts all I/O events originating from processes executing on a computer system. The filesystem minifilter driver extracts system event metadata from the I/O events and transmits it to a protection service executing on the computer system. The protection service stores the metadata and backs up any file being changed by the I/O event for later use to undo the changes effected by the I/O events. The filesystem minifilter driver then releases the I/O events to the operating system, thereby enabling the I/O events to be performed. When the computer system is rebooted and/or when a computer user requests a system restore operation, the protection service restores the changed files to their initial state by replacing the changed files with the backup files.

In another embodiment of the disclosure, the protection system writes canary files to selected data folders that are exempted from being restored during the above-mentioned system restore operation. The filesystem minifilter driver monitors and intercepts all I/O events originating from processes executing on a computer system. The filesystem minifilter driver extracts system event metadata from the I/O events and transmits it to a protection service executing on the computer system. The protection service stores the metadata and backs up any file being changed by the I/O event for later use to undo the changes effected by the I/O events. The filesystem minifilter driver then releases the I/O events to the operating system, thereby enabling the I/O events to be performed. However, if the protection service identifies that a canary file is being changed, the protection service automatically terminates the process effecting the change and restores all data files changed by the process or changed within a selected time period, regardless of whether the files are in data folders that are exempted from being restored.

The methods and systems described herein may be implemented using computer programming or engineering techniques including computer software, firmware, hardware, or any combination or subset therefor. At least one of the technical problems addressed by this system includes: (i) monitoring and restoring data files having unauthorized or unwanted changes made thereto; (ii) restoring data files to an initial known state; and (iii) automatically detecting and terminating malicious processes, and undoing any data changes made by such processes.

A technical effect of the systems and methods described herein is achieved by performing at least one of the following operations: (i) starting a filesystem minifilter driver; (ii) monitoring and intercepting an input/output (I/O) event directed to a target filesystem object; (iii) extracting system event metadata from the I/O event; (iv) recording the system event metadata in a record file; (v) creating a backup copy of the target filesystem object; (vi) releasing the I/O event to enable the I/O event to be performed on the target filesystem object; and (vii) replacing the target filesystem object with the backup copy during a system restore operation.

The resulting technical effect achieved by the systems and methods described herein is at least one of: (i) protecting data files against unauthorized and unwanted changes; (ii) identifying and terminating malicious processes operating on a computer system; (iii) and automatically restoring a computer to an initial known state upon a system reboot.

As will be appreciated, based on the description herein, the technical improvement in computer systems experiencing unauthorized or unwanted data changes as described is a computer-based solution to a technical deficiency or problem that is itself rooted in computer technology (i.e., the problem itself derives from the use of computer technology). The present invention improves upon the conventional methods and systems for protecting data files against unauthorized and unwanted changes in the manners described herein. Thus, the inefficiencies or technical problems created by the conventional systems and methods as described herein are solved by the methods and systems described and particularly claimed herein.

Data Protection System

Typically, a processor in a computer running an operating system, such as UNIX®, LINUX®, Microsoft Windows®, and macOS®, has two distinct operating modes: user mode and kernel mode. The processor switches between the two modes depending on what type of code is running on the processor. For example, applications run in user mode and core operating system (OS) components run in kernel mode.

In user mode, the executing code (e.g., an application) has no ability to directly access hardware or reference memory. The executing code running in user mode must delegate to system application programming interfaces (APIs) to access hardware or memory. In kernel mode, the executing code (e.g., a core OS component) has complete and unrestricted access to the underlying hardware. The code can execute any processor instruction and reference any memory address. Kernel mode is generally reserved for the lowest-level, most trusted functions of the operating system (OS).

When a user mode application is started, the operating system typically creates a process for the application. The process provides the application with a virtual address space and a handle table. In computer programming, a handle is an abstract reference to a resource (e.g., the application). Handles are used when application software references blocks of memory or objects managed by another system, such as the OS or a database. A resource handle can be an opaque identifier, in which case it is often an integer number (e.g., often an array index in an array or "table" that is used to manage that type of resource), or it can be a pointer that allows access to further information.

Common resource handles include, for example, file descriptors, network sockets, process identifiers (PIDs), and job IDs. PIDs and job IDs are explicitly visible integers, while file descriptors and sockets (which are often implemented as a form of file descriptor) are represented as integers but are typically considered opaque. The PID is a number used by the OS kernel to uniquely identify the active process. This number may be used as a parameter in various function calls, allowing processes to be manipulated, such as adjusting the process's priority or terminating it altogether.

When a process (one created by the OS for an application, as described above) wants to access a file, the process issues a request to the filesystem of the OS to obtain a reference (or handle) to the file. Typically, the file, if it exists, is opened; however, a new file may be created if one does not already exist. After the handle to the file is obtained by the process, the process can write data into the file by transmitting the handle and the data to be written to the filesystem. To read data from the file, the process transmits to the filesystem the handle and a memory location to hold the data to be read. The systems and methods described herein include a filesystem minifilter driver that adds value to or modifies the behavior of the filesystem. The filesystem minifilter driver is a kernel-mode component that runs as part of the OS executive. The filesystem minifilter driver intercepts input/output (I/O) events (i.e., operations/requests), such as requests for obtaining handles, writing and reading data, and closing handles, that are directed toward filesystem objects (e.g., files and/or folders (or directories)) by a process (i.e., by any non-kernel mode process) before being transmitted to the filesystem.

Exemplary Computing System

FIG. 1 is a block diagram of an example user computing system 100. The user computing system 100 may be any suitable computing system including, for example, and without limitation, a desktop computer, a laptop computer, a server system, a tablet computer, a mobile device (e.g., a smartphone), and the like. In the exemplary embodiment, the user computing system 100 includes a processor 102 for executing instructions. The processor 102 may include one or more processing units arranged, for example, in a multi-core configuration. In some examples, executable instructions are stored in a memory device 104. The memory device 104 is any device allowing information, such as executable instructions and/or other data, to be stored and retrieved. For example, and without limitation, the memory device 104 may include one or more random access memory (RAM) modules or other type of dynamic memory device, one or more flash memory modules, and/or any other type of tangible machine-readable medium. The memory device 104 may store a set of instructions detailing a method that when executed by one or more processors, such as the processor 102, cause the one or more processors to perform the method.

The user computing system 100 also includes a persistent storage device 105 for storing data files, such as an operating system (OS), programs and/or applications, and user data files. The persistent storage device 105 may also be referred to as a non-volatile storage device. The persistent storage device 105 is any device allowing the data described to be stored and retrieved, such as, for example, one or more internal or external magnetic/solid-state/optical recording media and its corresponding drive (e.g., hard disks, solid-state drives (SSDs), and/or CD-ROM/DVD-ROM drives). In addition, the persistent storage device 105 includes a filesystem 114, which includes a protected storage repository 116 (e.g., a protected folder, volume, logical drive, or the like) defined therein for storing protected data 120, as is described further herein. The filesystem 114 includes a plurality of data files, including, for example, one or more canary files $118_1$-$118_n$. As is described further herein, the canary files $118_1$-$118_n$ are data files created by a protection system 230 (shown in FIG. 3) and saved to the filesystem 114 for the purpose of facilitating detection of malicious system events.

In one example embodiment, the processor 102 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

In the exemplary embodiment, the user computing system 100 includes a user interface device 106 for receiving data from a user 108 and/or for presenting data to the user 108. The user interface device 106 may include, for example, a keyboard, a pointing device, a mouse, a stylus, a touch sensitive panel (e.g., a touch pad or a touch screen), a gyroscope, an accelerometer, a position detector, an audio input device, and/or the like. In some embodiments, the user interface device 106 operates to receive data from the user 108, while another device (e.g., a presentation device) operates to present data to the user 108. In other embodiments, the user interface device 106 is a single component, such as a touch screen, that functions to both output data to the user 108 and receive data from the user 108. In such embodiments, the user interface device 106 operates as a presentation device for presenting information to the user 108. In such embodiments, the user interface device 106 represents any component capable of conveying information to the user 108. For example, and without limitation, the user interface device 106 may include a display device (e.g., a liquid crystal display (LCD), organic light emitting diode (OLED) display, or "electronic ink" display) and/or an audio output device (e.g., speakers or headphones). In some embodiments, the user interface device 106 includes an output adapter, such as a video adapter and/or an audio adapter. An output adapter is operatively coupled to the processor 102 and configured to be operatively coupled to an output device, such as a display device or an audio output device.

In the exemplary embodiment, the user computing system 100 further includes a network communication interface 110, which enables the user computing system 100 to communicate with a remote device (e.g., another computing device) via a communication medium, such as a wired or wireless packet network. For example, and without limitation, the user computing system 100 may transmit and/or receive data via the network communication interface 110. The user interface device 106 and/or the network communication interface 110 may be referred to collectively as an input interface and may be configured to receive information from the user 108.

In some embodiments, the user computing system 100 may further include a storage interface 112 that enables the user computing system 100 to communicate with one or more data storage devices, which store user files, software applications, and/or any other data suitable for use with the methods described herein. For example, in some suitable embodiments, the storage interface 112 may couple the user computing system 100 to a storage area network (SAN) (e.g., a Fibre Channel network) and/or to a network-attached storage (NAS) system (e.g., via a packet network). The storage interface 112 may be integrated with the network communication interface 110.

Exemplary Logical Architecture of the Computing System

Figure 2:
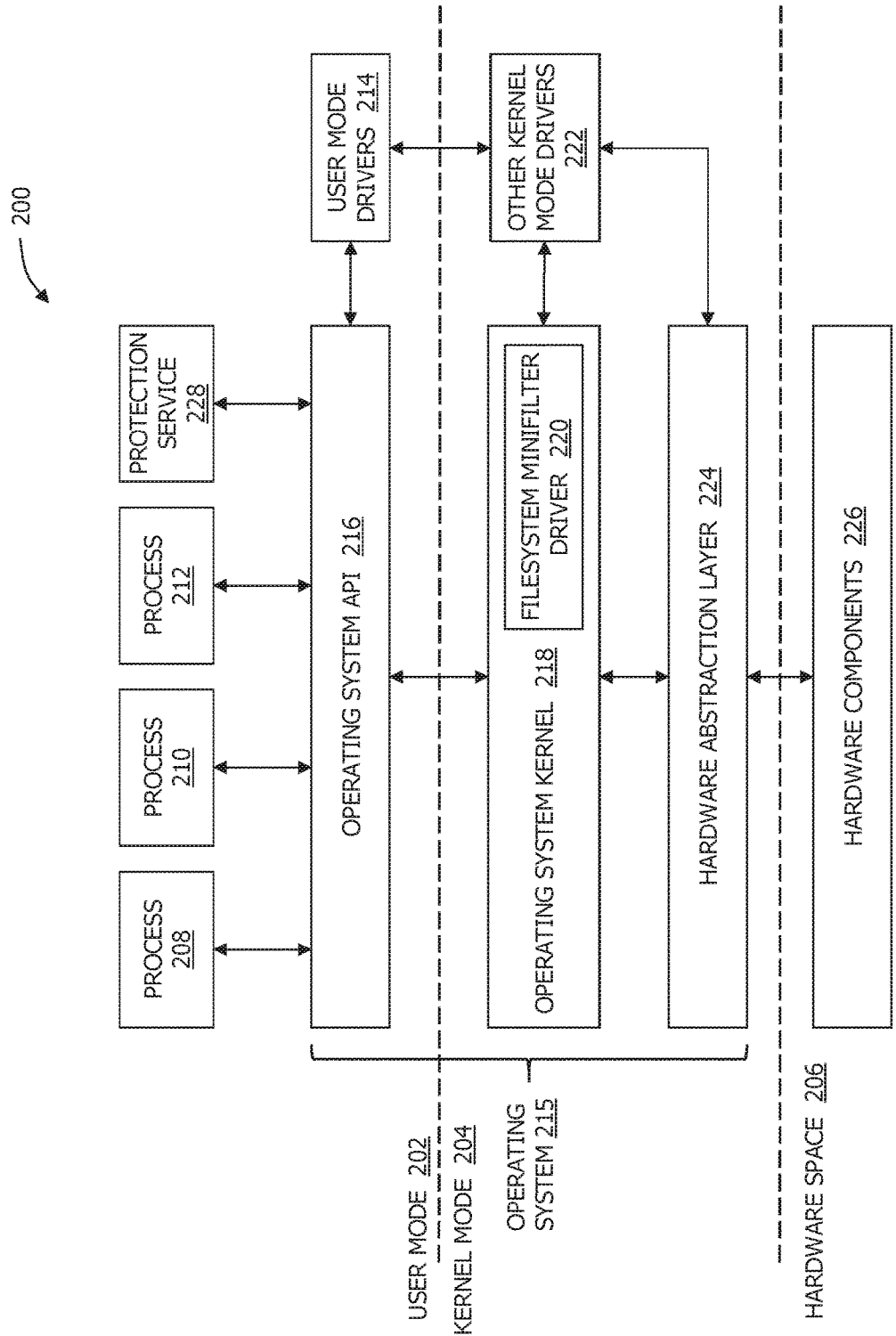
FIG. 2 is a block diagram illustrating a logical architecture of the user computing system shown in FIG. 1.

FIG. 2 is a block diagram illustrating a logical architecture 200 of the user computing system 100 shown in FIG. 1. The logical architecture 200 is illustrated with three distinct divisions or spaces: a user mode space 202; a kernel mode space 204; and a hardware space 206.

In the exemplary embodiment, various processes 208, 210, and 212, and user mode drivers 214 operate in the user mode space 202. Core operating system components of an operating system (OS) 215, such as an operating system kernel 218, a filesystem minifilter driver 220, and various low level, kernel mode drivers 222, operate in the kernel mode space 204. The hardware space 206 includes various hardware components 226 of the user computing system 100.

In the exemplary embodiment, each of the processes 208, 210, and 212 corresponds to an application or software program (including malware or ransomware). For example, in one embodiment, a user may execute a video application to create and/or edit a video. The video application typically calls functions, such as via an operating system application programming interface (API) 216 implemented by the OS 215. The operating system API 216 is a software program stored on the persistent storage device 105 and executing in memory, such as in the memory device 104 (shown in FIG. 1). The operating system API 216 provides several interfaces for performing tasks associated with the OS 215, such as accessing and/or creating files, sending/receiving data over a network, displaying a graphical user interface (GUI), receiving inputs specified in the GUI, etc. Each of the processes 208, 210, and 212 implements the appropriate interfaces exposed by the operating system API 216 for performing process tasks. In addition to the processes 208, 210, and 212, the user mode drivers 214 operate in the user mode space 202 and correspond to software programs that interface with the hardware components 226 of the user computing system 100. The user mode drivers 214 include, for example, and without limitation, printer drivers, image scanner drivers, digital camera drivers, and the like. In some embodiments, the operating system API 216 may invoke one or more of the user mode drivers 214 for performing some of the process tasks (e.g., scanning and/or printing a document).

In the exemplary embodiment, the operating system kernel 218 allows user mode applications, such as the processes 208, 210, and 212, to interact (e.g., via input/output (I/O) events) with the hardware components 226, which may include, for example, the processor 102, the memory device 104, the persistent storage device 105, the user interface device 106, the network communication interface 110, the storage interface 112 (each if which is shown in FIG. 1), and/or other hardware components, such as a printer, a graphics processing card, peripherals, and/or other devices. The operating system kernel 218 translates received I/O operations/requests (events) into data processing instructions for the processor 102 and/or other processing elements present in the user computing system 100. The I/O operations/requests are received from the operating system API 216 during the execution of tasks requested by the processes 208, 210, and 212.

In the exemplary embodiment, the hardware abstraction layer (HAL) 224 is a layer of software that interacts between the hardware components 226 and other components of the OS 215, such as the operating system kernel 218. Because the HAL 224 abstracts (hides) the low-level hardware details from drivers, such as the drivers 220 and 222, and the operating system kernel 218, it is called the hardware abstraction layer. The HAL 224 provides routines and/or a set of standard calls to the hardware components 226, enabling the operating system kernel 218 and kernel mode drivers, such as drivers 220 and 222, to gain access to the hardware components 226.

As described above, the processes 208, 210, and 212 interact with the operating system API 216, which in turn interfaces with the operating system kernel 218. More particularly, in one embodiment, for the processes 208, 210, and 212 to interact with the persistent storage device 105 or hard drive components in the hardware space 206, the processes interact with the filesystem minifilter driver 220 via the operating system API 216. In this manner, the processes 208, 210, and 212 communicate from the user mode space 202 to the kernel mode space 204.

Within the kernel mode space 204, the filesystem minifilter driver 220 is a driver located in the input/output (I/O) path and that is positioned before other drivers (e.g., a system underlying input/output driver (not shown). The filesystem minifilter driver 220 communicates with the hardware components 226 in the hardware space 206 to read, write, modify, or otherwise access data (e.g., files/folders stored in the persistent storage device 105). That is, the filesystem minifilter driver 220 is software that facilitates the processes 208, 210, and 212 to store/retrieve data stored on the persistent storage device 105. As such, all I/O operations/requests directed to the filesystem 114 (shown in FIG. 1) of the OS 215 are intercepted and recorded by the filesystem minifilter driver 220, which in turn translates the received I/O operations/requests into corresponding I/O operations/requests that are then processed by the operating system kernel 218.

The filesystem minifilter driver 220 returns the data, information, or results to the OS 215, which returns it to the processes 208, 210, and 212 associated with the applications. As such, the filesystem minifilter driver 220 intercepts all of the I/O operations/requests (e.g., the activity of the persistent storage device 105), temporarily suspends the I/O operations/requests, and records (via a protection service 228) the activity of the operations on a file/folder prior to allowing the I/O operations/requests to actually be performed on the files/folders. The activity is forwarded by the filesystem minifilter driver 220 to the protection service 228 operating in the user mode space 202 for recordation. As is described herein, the protection service 228 is a background process that operates to protect (e.g., via file/folder restoration) the files/folders of the user computing system 100 from unintended changes, for example, that may be made by malware or ransomware.

Exemplary Protection Service Structure

Figure 3:
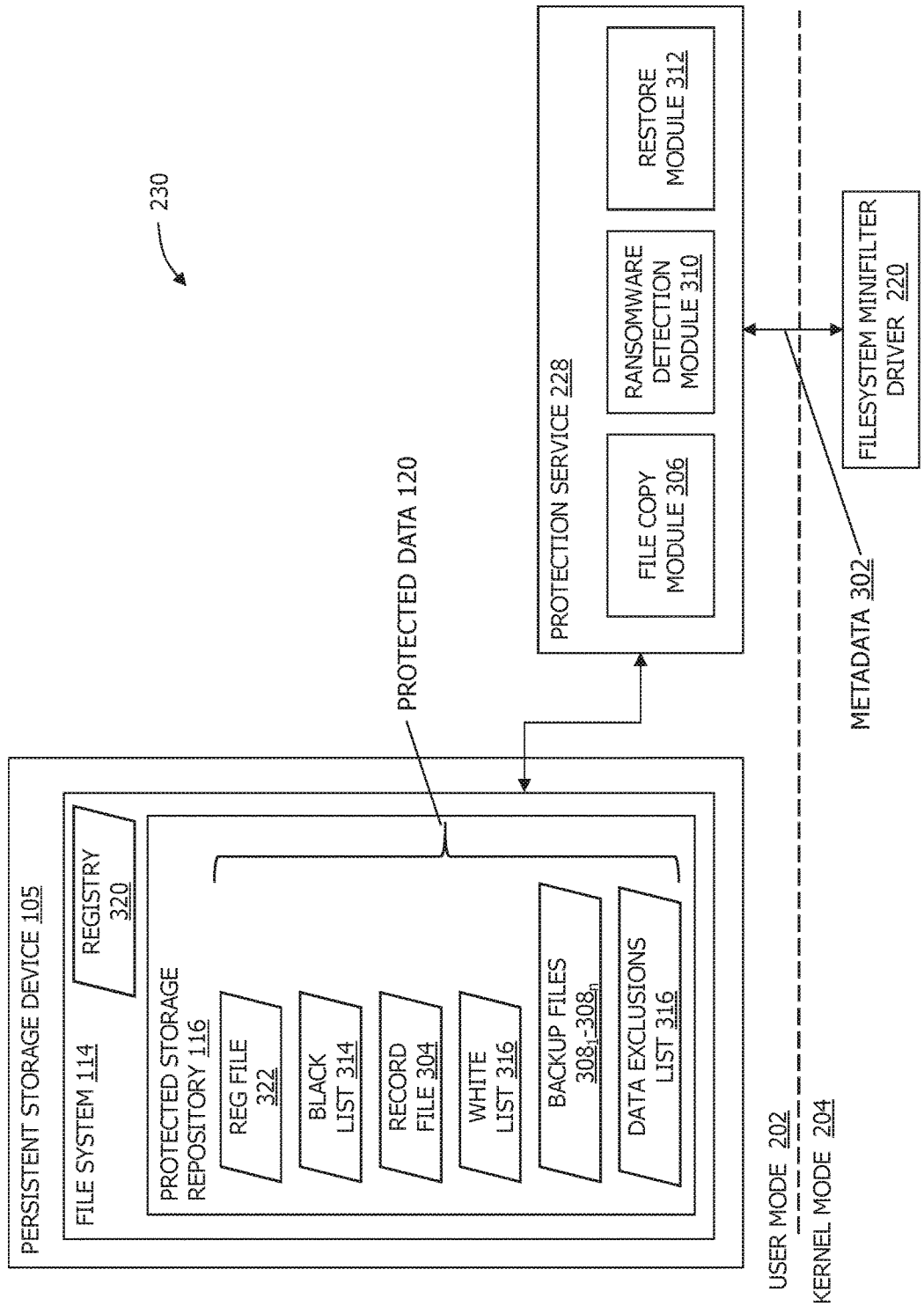
FIG. 3 is a block diagram illustrating the structure of a protection system for use on the user computing system shown in FIG. 1.

FIG. 3 is a block diagram illustrating the structure of a protection system 230 for use on the user computing system 100 (shown in FIG. 1). The protection system 230 tracks changes to the objects (e.g., files and/or folders stored on the persistent storage device 105) of the filesystem 114 (shown in FIG. 1) of the user computing system 100 and enables restoring the filesystem objects to a previous known state by removing unauthorized or otherwise unwanted changes to the filesystem objects. As described above, the processor 102 of the user computing system 100, when running the OS 215, operates in two distinct modes: the user mode and kernel mode, represented as the user mode space 202 and the kernel mode space 204, respectively.

In the exemplary embodiment, the protection system 230 includes the filesystem minifilter driver 220 that operates in the kernel mode space 204, and the protection service 228 that operates in the user mode space 202. The filesystem minifilter driver 220 is a software module that monitors and intercepts all system events that affect data stored on the user computing system 100 (e.g., data stored on the persistent storage device 105 or one or more data storage devices coupled to the storage interface 112), including, for example, and without limitation, file access events (e.g., read/write/delete file(s)); registry events (e.g., add/delete/update registry keys and add/delete/update registry values); and process events (e.g., create/terminate processes/threads). The filesystem minifilter driver 220 transmits system event metadata 302 to the protection service 228, including, for example, and without limitation, a process identifier (PID) associated with the process performing the event, a user account associated with the process, a target filesystem object (i.e., file/folder) targeted by the system event, location data associated with the target filesystem object affected by the event, time and date of the event, and any other metadata associated with the event that may be used to create a snapshot of the event that enables the event to be completely reversed.

The protection service 228 is a software module that runs as a background process and processes all activities of the protection system 230. The protection service 228 receives the system event metadata 302 from the filesystem minifilter driver 220 and stores the system event metadata 302 in the protected storage repository 116 (shown in FIG. 1). For example, and without limitation, the protection service application 228 may store the system event metadata 302 in one or more record files 304, e.g., in one or more log files, in one or more tables of a database, and/or in any other manner that enables the protection system 230 to function as described herein.

The protection service 228 includes a file copy module 306. The file copy module is a software module that operates to copy or backup each data file being modified/created/deleted. For example, and without limitation, the filesystem minifilter driver 220 may transmit system event metadata 302 that indicates that one or more data files on the filesystem 114 are about to be modified/created/deleted. The file copy module 306 creates a copy of each of the data files (i.e., the data files on the persistent storage device 105) in the protected storage repository 116 as backup data files $308_1$-$308_n$ before the operation is performed. This enables the modified/created/deleted data files to be replaced on the filesystem 114 with the backed-up copy in the protected storage repository 116 during a system restore operation 500 (shown in FIG. 5), as described herein. As such, the number of backup files is reduced as compared to typical full system backups, thereby reducing any negative impact on the performance of the user computing system 100. In some embodiments, the file copy module 306 may initiate the creation of a system restore point during the startup or launch of the protection system 230.

The protection service 228 also includes a ransomware detection module 310. The ransomware detection module 310 is a software module that detects malicious system events, such as file encryption activity, by (i) generating the canary files $118_1$-$118_n$ in the filesystem 114 and (ii) monitoring the canary files $118_1$-$118_n$ for any system events, such as and I/O operations/requests, directed to them. The canary files $118_1$-$118_n$ are dummy data files that are hidden from the user, such as the user 108 (shown in FIG. 1), using typical filesystem attributes. The naming convention for the canary files $118_1$-$118_n$ is designed to blend in with the type of data files already stored in filesystem 114. More particularly, each of the canary files $118_1$-$118_n$ is configured to have a naming convention similar to other data files stored in the specific folder holding the data files. For example, and without limitation, if .DOCX files are stored in a DOCUMENTS folder, then the associated canary files $118_1$-$118_n$ stored in the DOCUMENTS folder will include a .DOCX extension. Such a naming convention facilitates preventing a malware/ransomware application from identifying the canary files $118_1$-$118_n$.

When the system event metadata 302 indicates that a canary file $118_1$-$118_n$ is being modified/deleted by a process, such as the processes 208, 210, or 212, the ransomware detection module 310 detects the system event, identifies the system event as being malicious, and identifies the malicious process (i.e., the executable file) by its PID contained in the system event metadata 302 and any associated parent\child processes and their PIDs. The ransomware detection module 310 requests that the filesystem minifilter driver 220 pause all other system events (e.g., all I/O operations/requests) and may, in some embodiments, request that the malicious system event be blocked from being performed. While the other system events are paused, the ransomware detection module 310 may automatically instruct a restore module 312 to restore any data files that were modified/created/deleted by the malicious process(es). In another embodiment, the ransomware detection module 310 may issue an alert to the user, such as the user 108, that the protection system 230 has detected unauthorized changes (e.g., potential ransomware) operating on the user computing system 100) to one or more data files/folders on the filesystem 114. The alert may be an audible and/or visual indication presented to the user on the user computing device 100. For example, and without limitation, in one suitable embodiment, the alert may consist of a text box that is displayed to the user via the user interface device 106 with a message suggesting restoring the data it has preserved to eliminate any potential threat. In addition, the ransomware detection module 310 suspends and/or terminates the malicious process(es) to prevent the process(es) from further execution on the user computing system 100. As described further herein, the malicious process(es) may be added to a black list 314 and a system restore operation 500 (shown in FIG. 5) may be automatically performed to remove the malicious process(es) from the user computing system 100. In some embodiments, the black list 314 may be used prospectively by the protection service 228 to automatically prevent processes included therein from performing system events and may automatically terminate the process and initiate a system restore operation 500.

The protected storage repository 116 is any suitable database used to backup files on the user computing system 100 and store data relevant to the operation of the protection system 230. As described above, in the exemplary embodiment, the protected storage repository 116 is a protected folder, volume, logical drive, database, or the like, created on the persistent storage device 105 for storing the protected data 120. In some suitable embodiments, the persistent storage device 105 includes one or more internal or external magnetic/solid-state/optical recording media/drives (e.g., hard disks, solid-state drives (SSDs), and/or CD-ROM/DVD-ROM drives). In the exemplary embodiment, the protected storage repository 116 is located on the same persistent storage device 105 where the OS 215 and the data files being modified/created/deleted are stored. The protected data 120 includes, for example, and without limitation, the one or more record files 304 for recording the system event metadata 302, the backup data files $308_1$-$308_n$, the black list 314, a white list 316, and a data exclusions list 318. The protected storage repository 116 is protected against unauthorized change by the filesystem minifilter driver 220, which only allows access from authorized processes associated with the protection system 230. All other processes are forbidden access to the protected storage repository 116.

The white list 316 is a data file that includes one or more users, user accounts, and/or process/file identifiers (e.g., user names, accounts, file names, CRC checksums, hash function digests, and the like) that identify users, user accounts, processes, and/or files (also referred to as "authorized elements") that are authorized to perform various system events, such as file access events (e.g., create/delete/write file(s)); registry events (e.g., create/delete/update registry keys and add/delete/update registry values); and process events (e.g., create/terminate processes/threads). The white list 316 may be used by the protection service 228 to ignore white listed process system events when performing a system restore operation 500, as described herein. That is, data changes that are performed by white listed users, user accounts, and/or processes may not be restored to an initial state during a system restore operation 500.

The data exclusions list 318 is a data file that identifies one or more files and/or folders of the filesystem 114 that are to be excluded from being restored during a system restore operation (i.e., excluded filesystem objects), as described herein. For example, in some operating systems, a user account may be associated with one or more user folders that allows users to save and organize personal documents, pictures, downloaded files, and/or other files separately from other user accounts. Files contained in such user folders may be modified/created/deleted by a user, such as the user 108, during use of the user computing system 100. Typically, the user 108 will wish to keep these changes after a system restore operation 500. As such, the user folders may be added to the data exclusions list 318 such that the files contained in such user folders are excluded from being restored.

Exemplary Computer-Implemented Methods

FIGS. 4-6, 7A, and 7B illustrate various computer-implemented methods for protecting a computing system, such as the user computing system 100 (shown in FIG. 1), against unauthorized changes to data (e.g., file/folders), in accordance with embodiments of the present disclosure. The operations described with respect to each of the computer-implemented methods below may be performed in the order shown in the figures or may be performed in a different order. Furthermore, some operations may be performed concurrently as opposed to sequentially. In addition, some operations may be optional.

While the operations within the computer-implemented methods are described below regarding the user computing system 100, the computer-implemented methods may be implemented using any other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain ones of the operations outlined herein. The program(s) stored on the computer-readable medium(s) may instruct the processor or processing units to perform additional, fewer, or alternative operations, including those discussed elsewhere herein.

Figure 4:
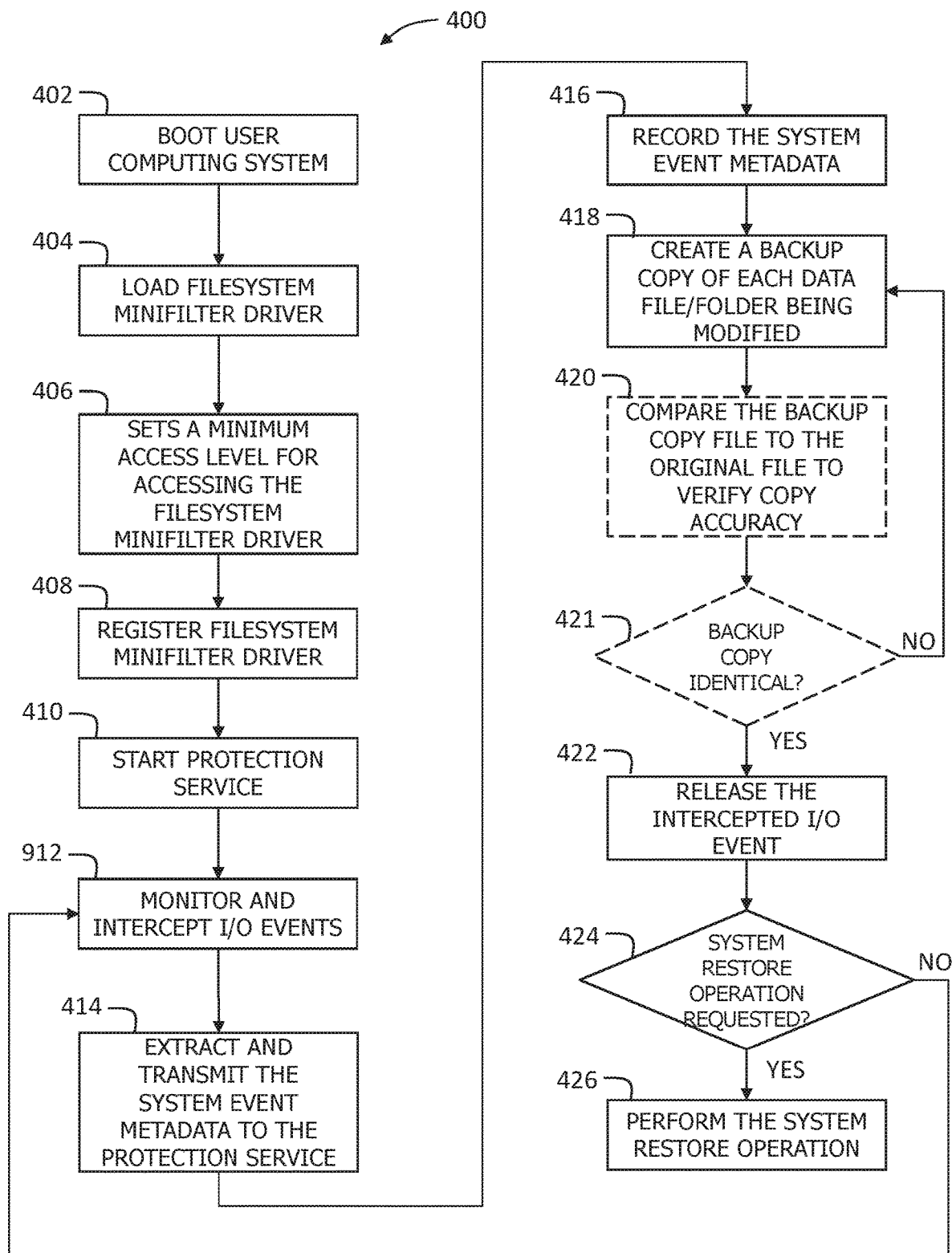
FIG. 4 is a flowchart illustrating an exemplary computer-implemented method for protecting data against unauthorized changes, in accordance with one embodiment of the present disclosure.

FIG. 4 is a flowchart illustrating an exemplary computer-implemented method 400 for protecting data against unauthorized changes, in accordance with one embodiment of the present disclosure. The computer-implemented method 400 is described below, for ease of reference, as being executed by exemplary devices and components introduced with the embodiments illustrated in FIGS. 1-3. In one embodiment, the computer-implemented method 400 may be implemented by the user 108 using a computing device, such as the user computing system 100. In the exemplary embodiment, the computer-implemented method 400 relates to monitoring data changes and restoring the changed data to an initial monitored state, using, for example, the protection system 230.

The computer-implemented method 400 includes, at operation 402, booting the user computing system 100. When the user computing system 100 is first powered on, a series of operations are performed that prepare the user computing system 100 for use. Typically, an initial operation, called the power-on self-test (or POST) is a performed. The POST is a diagnostic testing sequence that the user computing system 100 performs to identify and determine if the hardware associated with or connected to the user computing system 100 is working correctly. The POST is followed by a booting sequence that generally involves loading a portion of the operating system kernel 218, which includes a kernel-mode filesystem driver (not shown) and the hardware abstraction layer (HAL) 224. In particular, the operating system kernel 218 is stored on persistent storage device 105 and the portion is loaded into the memory device 104, as is known in the art. The kernel-mode filesystem driver performs all disk read/write requests from the operating system API 216. The HAL 224 involves abstracting specific hardware, such as the persistent storage device 105, in order to make it appear generic with respect to, and therefore easier to use by, the user 108 operating the user computing system 100.

At operation 404, the filesystem minifilter driver 220 is loaded (e.g., started, executed, etc.) during the booting sequence, for example, into the memory device 104. As described herein, the filesystem minifilter driver 220 operates in the in the kernel mode space 204 and intercepts all disk read/write events/request from the operating system API 216 before they are received and performed by the kernel-mode filesystem driver. By loading the filesystem minifilter driver 220 during the initial booting sequence, all access by one or more of the processes 208, 210, or 212

(including, for example, malware/ransomware processes) to the data stored on the persistent storage device 105 may be monitored and recorded by first being processed by the filesystem minifilter driver 220.

At operation 406, the operating system kernel 218 sets a minimum access level for accessing (i.e., disabling, unloading, etc.) the filesystem minifilter driver 220. For example, and without limitation, in one suitable embodiment, the minimum access level may be a parameter of the operating system kernel 218 set to prevent access to the filesystem minifilter driver 220 from predetermined user accounts (e.g., guest, local user, administrator, etc.), only granting access to the system account (e.g., in a Windows® OS, the LocalSystem Account). In other embodiments, the minimum access level may be set to allow access to one or more authorized ser accounts, but access may be further limited by requiring user authentication using, for example, a password, biometrics, etc., as an authentication input. Limiting access to the filesystem minifilter driver 220 facilitates preventing the inadvertent or malicious disabling of the filesystem minifilter driver 220.

At operation 408, the filesystem minifilter driver 220 registers with the operating system kernel 218, and more particularly, with a filter manager of the operating system kernel 218. During registration, the filesystem minifilter driver 220 elects to receive one or more PreOperation and/or PostOperation callbacks for I/O operations/requests. PreOperation callbacks are invoked before each I/O operation/request is passed on to the filesystem, such as the filesystem 114 (or the next lowest altitude minifilter). PostOperation callbacks are invoked after the filesystem 114 (and/or any lower minifilters) have processed the I/O operation/request. In the exemplary embodiment, the filesystem minifilter driver 220 is configured to receive at least one or more PreOperation callbacks associated with each I/O operation/request. Within the PreOperation callbacks, the filesystem minifilter driver 220 may monitor, track, manage, manipulate, and even accept or reject I/O operations/requests before the filesystem 114 receives them.

At operation 410, the protections service 228 is started. As described herein, in the exemplary embodiment, the protection service 228 is a background process that operates to protect the files/folders of the user computing system 100 from unintended changes. In one embodiment, the operating system API 216 optionally starts the protection service 228 as part of the booting sequence of the user computing system 100. In other embodiments, the protection service 228 may be manually started, for example, by the user 108, after the user computing system 100 has completed the booting sequence. It is noted that only those changes to the filesystem 114 that are recorded by the protection service 228 are undone, as described further herein. For example, if the protection service 228 is disabled for a period of time, changes are made to the filesystem 114, and the protection service 228 is reenabled after the changes, such changes will not be recorded and therefore cannot be undone. Temporarily disabling the protection service 228 facilitates allowing the operating system, such as the OS 215, to perform automatic maintenance, including for example, and without limitation, automatic OS updates. In addition, when installing new software, a user may not wish to have the changes undone. The user may temporarily disable the protection service 228 while installing the new software and, after installation has completed, re-enable the protection service 228. During a subsequent system restore operation, the OS updates and/or newly installed software will not be undone by the protection service 228.

To protect against unauthorized disabling of the protection service 228, the protection service 228 may require a user, such as the user 108, to authenticate himself prior to disabling the protection service 228. For example, and without limitation, the protection service 228 may require that the user 108 be using a user account with elevated privileges and input a password to access the protection service 228. In some embodiments, biometrics may be required to access the protection service 228, including, for example, a fingerprint, retina scan, etc.

At operation 412, the filesystem minifilter driver 220 monitors and intercepts each I/O operation/request performed by one of the processes 208, 210, or 212 (shown in FIG. 2). At operation 414, the filesystem minifilter driver 220 extracts and transmits the system event metadata 302 (e.g., data associated with each I/O operation/request) to the protection service 228. The protection service 228 is configured to communicate directly with the filesystem minifilter driver 220, for example, to receive the system event metadata 302, which includes, for example, and without limitation, a process identifier (PID) associated with the process performing the event, a user account associated with the process, a target filesystem object (i.e., file/folder) targeted by the system event, location data associated with the target filesystem object affected by the event, time and date of the event, and any other metadata associated with the event that may be used to create a snapshot of the event that enables the event to be completely reversed.

At operation 416, the protection service 228 records the system event metadata 302 in a record file 304 or other suitable recordation media (logs, tables, databases, etc.) stored in the protected storage repository 116. As described above, the protected storage repository 116 is protected by the filesystem minifilter driver 220 against unauthorized changes. The filesystem minifilter driver 220 only allows access from authorized processes and or user accounts associated with or privilege to access the protection system 230. All other processes and/or user accounts are forbidden access to the protected storage repository 116.

At operation 418, the protection service 228 automatically executes the file copy module 306 to create a backup copy of each data file/folder in which the system event metadata 302 indicates is being modified/created/deleted by a respective I/O operation/request. In particular, the file copy module 306 writes a backup copy of the affected data file/folder to the protected storage repository 116 before the filesystem minifilter driver 220 releases the I/O operation/request to the underlying input/output driver to perform the I/O operation/request on the filesystem 114.

In one suitable embodiment, indicated by optional operation 420, the protection service 228 may compare the backup copy file to the original file to verify the accuracy of the backup copy (i.e., that the backup copy file and the original file are substantially identical). For example, and without limitation, the protection service 228 may carry out a byte-for-byte comparison of the two files or may generate a hash value for each file and compare the hash values. As used herein, the term "hash value" includes any type of file fingerprint, hash function output, checksum, digital signature, and/or unique identifier of a file or a portion of a file. At optional operation 421, if the comparison indicates that the backup copy file and the original file are substantially identical, the process continues at operation 422, otherwise, the backup copy file is deleted, and the method returns to operation 418.

At operation 422, the filesystem minifilter driver 220 releases the intercepted I/O operation/request, thereby enabling to operation to be processed or performed. That is, after recording the changes being made by the I/O operation/request, the I/O operation/request is allowed to complete. As such, the associated files/folders may be created/modified/deleted by the requesting process, such as a process 208, 210, or 212.

It is noted that the operations 412, 414, 416, 418, 420 (optionally), and 422, described above, are performed continuously during a period when the protection system 230 is operating. That is, all I/O operations/requests are continuously monitored, intercepted, and recorded, and each modified or deleted file is backed up or copied during such a period.

At operation 424, the protection service 228 determines whether a system restore operation 500 (shown in FIG. 5) has been requested. If a system restore operation has been requested, at operation 426, the protection service 228 performs the system restore operation 500 to restore the files and/or folders that were changed by the recorded I/O operations/requests to their initial monitored state. If a system restore operation has not been requested, the process returns to and continues from operation 412.

Figure 5:
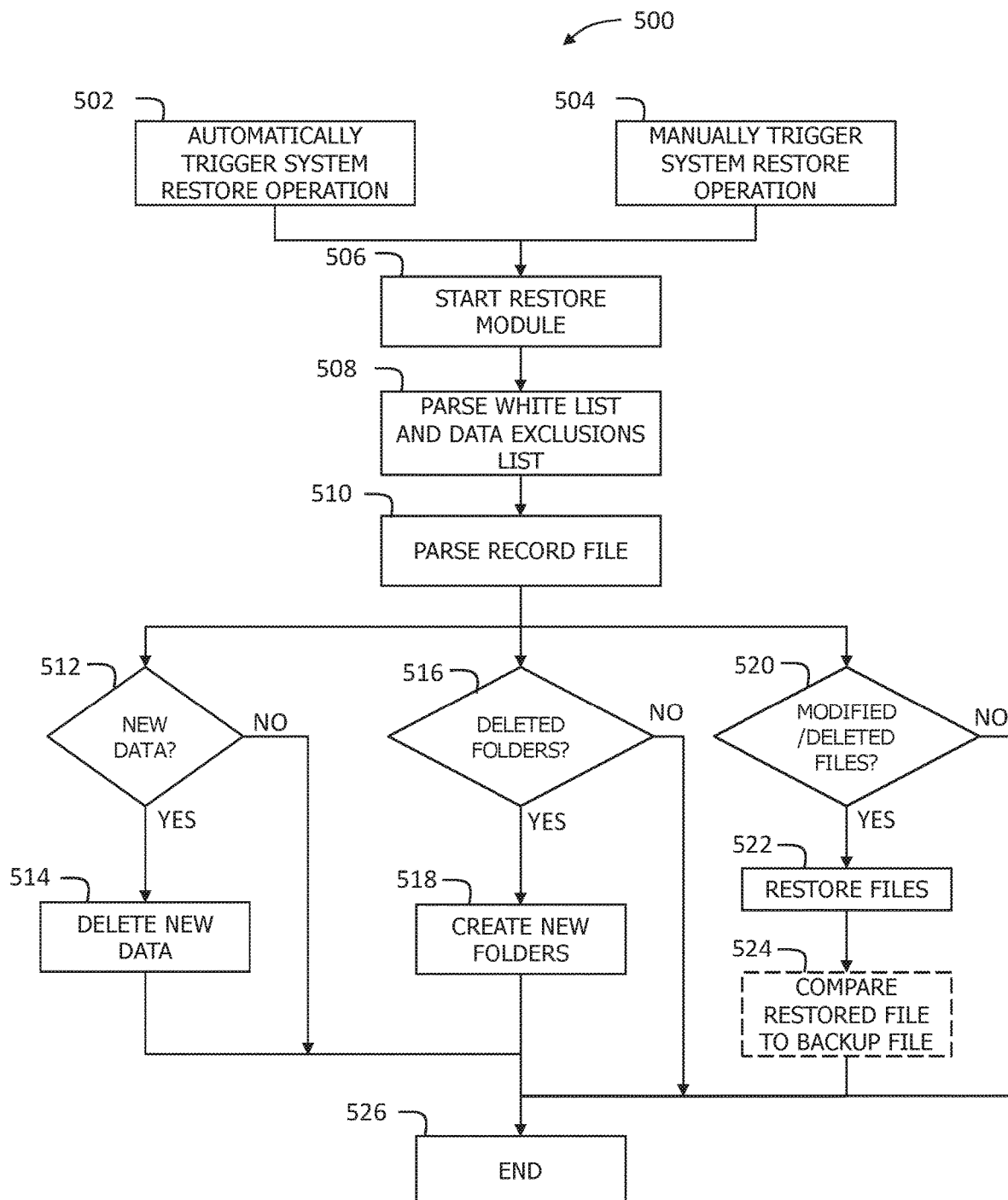
FIG. 5 is a flowchart illustrating a system restore operation, in accordance with one embodiment of the present disclosure.

FIG. 5 is a flowchart illustrating the system restore operation 500, in accordance with one embodiment of the present disclosure. In the exemplary embodiment, the system restore operation 500 may be requested (or triggered) automatically, as indicated by reference character 502, or manually, as indicated by reference character 504. An automatic request may be performed, for example, and without limitation, upon a rebooting of the user computing system 100 and/or a predefined triggering event having occurred. A manual request may be performed, for example, by the user 108 initiating the system restore operation 500 from within the protection service 228.

After the system restore operation 500 is requested, at operation 506, the protection service 228 starts the restore module 312 to restore the data files/folders that were modified/created/deleted by one or more of the monitored processes, such as the processes 208, 210, or 212. At operation 508, the restore module 312 parses the white list 316 and the data exclusions list 318 to identify user accounts, processes, and/or files/folders that are to be ignored or excluded during the system restore operation 500.

At operation 510, the restore module 312 parses the record file 304, reading the recorded system event metadata 302 contained therein to identify changes to the filesystem 114 that are to be undone (i.e., files/folders that are to be removed and/or restored). At operation 512, the restore module 312 determines from the recorded system event metadata 302 whether any new files/folders were written to the filesystem 114 by one or more monitored processes. If any new files/folders were written, at operation 514, the restore module 312 deletes each of the new files/folders that were written to the filesystem 114. If no new files/folders were written, the system restore operation 500 continues without deleting any files/folders from the filesystem 114.

At operation 516, the restore module 312 determines from the recorded system event metadata 302 whether any folders were deleted from the filesystem 114 by one or more monitored processes. If any folders were deleted, at operation 518, the restore module 312 creates each of the folders that were deleted on the filesystem 114, except those identified in the data exclusions list 318 or deleted by user accounts and/or processes identified in the white list 316. If no folders were deleted, the system restore operation 500 continues without creating any folders on the filesystem 114.

At operation 520, the restore module 312 determines from the recorded system event metadata 302 whether any data files were deleted from or modified on the filesystem 114 by one or more monitored processes. If any data files were deleted or modified, at operation 522, the restore module 312 restores the deleted or modified files to their initial monitored state, except for those data files identified in the data exclusions list 318 or those files deleted or modified by user accounts and/or processes identified in the white list 316. In particular, the restore module 312 deletes the affected file from the filesystem 114 and writes a copy of the backed-up file from the protected storage repository 116 back to its original location in the filesystem 114, creating a restored file.

In one suitable embodiment, indicated by optional operation 524, the restore module 312 may compare the restored file to the backed-up file in the protected storage repository 116 to verify the accuracy of the restored file (i.e., that the backup copy file and the original file are substantially identical). For example, and without limitation, the restore module 312 may carry out a byte-for-byte comparison of the two files or may generate a hash value for each file and compare the hash values. As used herein, the term "hash value" includes any type of file fingerprint, hash function output, checksum, digital signature, and/or unique identifier of a file or a portion of a file. It is noted that the operations 512, 516, and 520, and each associated operation, may be performed in any order and/or performed substantially at the same time.

At the completion of the operations 512-524, the system restore operation 500 clears the system event metadata 302 for the record file 304, as indicated at operation 526. That is, each entry is removed after it is undone and/or excepted by the system restore operation 500. As such, a monitoring process begins anew after a system restore operation 500 is completed. It is noted that the protection service 228 may include, for example, and without limitation, an option for an authorized user to clear the record file 304 at his or her request. This facilitates a user effectively committing any monitored changes to the filesystem 114 to a permanent state that cannot be undone by a system restore operation. At operation 528, the system restore operation 500 ends.

Figure 6:
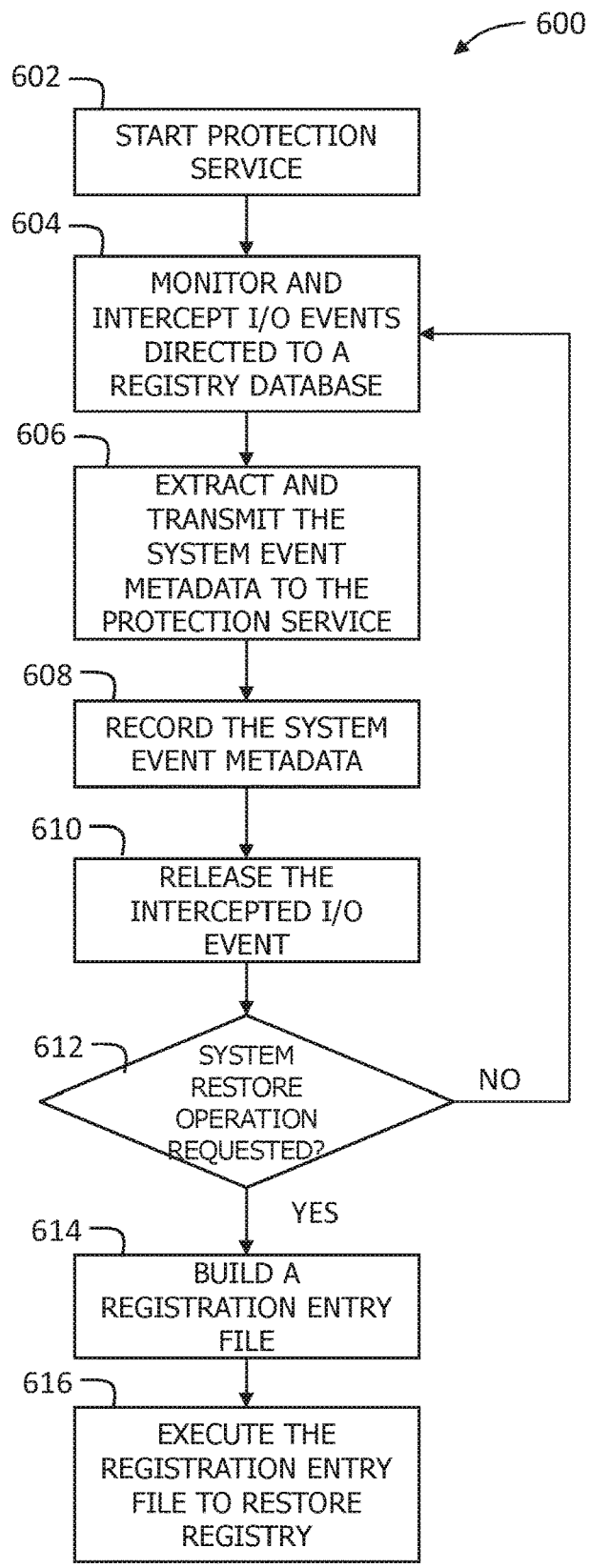
FIG. 6 is a flowchart illustrating an exemplary computer-implemented method for protecting registry data against unauthorized changes, in accordance with one embodiment of the present disclosure.

FIG. 6 is a flowchart illustrating an exemplary computer-implemented method 600 for protecting registry data against unauthorized changes, in accordance with one embodiment of the present disclosure. The computer-implemented method 600 is described below, for ease of reference, as being executed by exemplary devices and components introduced with the embodiments illustrated in FIGS. 1-3. In one embodiment, the computer-implemented method 600 may be implemented by the user 108 using a computing device, such as the user computing system 100. In the exemplary embodiment, the computer-implemented method 600 relates to monitoring registry changes and restoring the changed registry to an initial monitored state, using, for example, the protection system 230.

At operation 602, the protection system 230 is started. In particular, the filesystem minifilter driver 220 is loaded and registered with the operating system kernel 218 in the same manner as described above with reference to the method 400 at operations 402, 404, 406, and 408. In addition, the protection service 228 is started as described above with reference to the method 400 at operation 410.

At operation 604, the filesystem minifilter driver 220 monitors and intercepts I/O events directed to a registry database (i.e., system event metadata 302), such as a registry 320 of the OS 215, performed by an application or process, such as one of the processes 208, 210, or 212. In one suitable embodiment, the registry database 320 is a Windows® registry, consisting of a hierarchical database comprising one or more data files called hives. In such an embodiment, the filesystem minifilter driver 220 monitors all I/O operations/requests directed to the various hives.

At operation 606, the filesystem minifilter driver 220 extracts and transmits the system event metadata 302 (e.g., data associated with each I/O event) to the protection service 228, which includes, for example, and without limitation, the keys and/or values of the registry 320 being changed (added/modified/deleted), a process identifier (PID) associated with the process performing the request/event, a user account associated with the process, a target filesystem object (i.e., registry hive) targeted by the system event, location data associated with the target filesystem object affected by the request/event, time and date of the request/event, and any other metadata associated with the request/event that may be used to create a snapshot of the request/event that enables the request/event to be completely reversed or undone.

At operation 608, the protection service 228 records the system event metadata 302 in a record file 304 or other suitable recordation media (logs, tables, databases, etc.) stored in the protected storage repository 116. It is noted that the operation 608 is performed during a period when the protection service 228 is running. That is, all registry database access requests or I/O events are continuously recorded while the protection service 228 is running. However, if the protection service 228 is closed, paused, or otherwise not operating, the registry database access requests or I/O events are not recorded and cannot be undone as described further herein. At operation 610, the filesystem minifilter driver 220 releases the intercepted I/O event, thereby enabling to registry change to be performed by the process.

At operation 612, the protection service 228 determines whether a system restore operation, such as operation 500, has been requested. If a system restore operation 500 has been requested, at operation 614, the protection service 228 builds a registration entry file 322 (e.g., a .REG file in Windows®) to restore the system registry 320. In particular, the protection service 228 uses the recorded keys and/or values that were changed as indicated by the system event metadata 302 to build the registration entry file 322 to undo the registry changes. At operation 616, the protection service 228 executes the registration entry file 322 to import/export/modify the changed keys and/or values to restore them to their original state. If a system restore operation 500 has not been requested, the method 600 returns to and continues from operation 604.

Figure 7A:
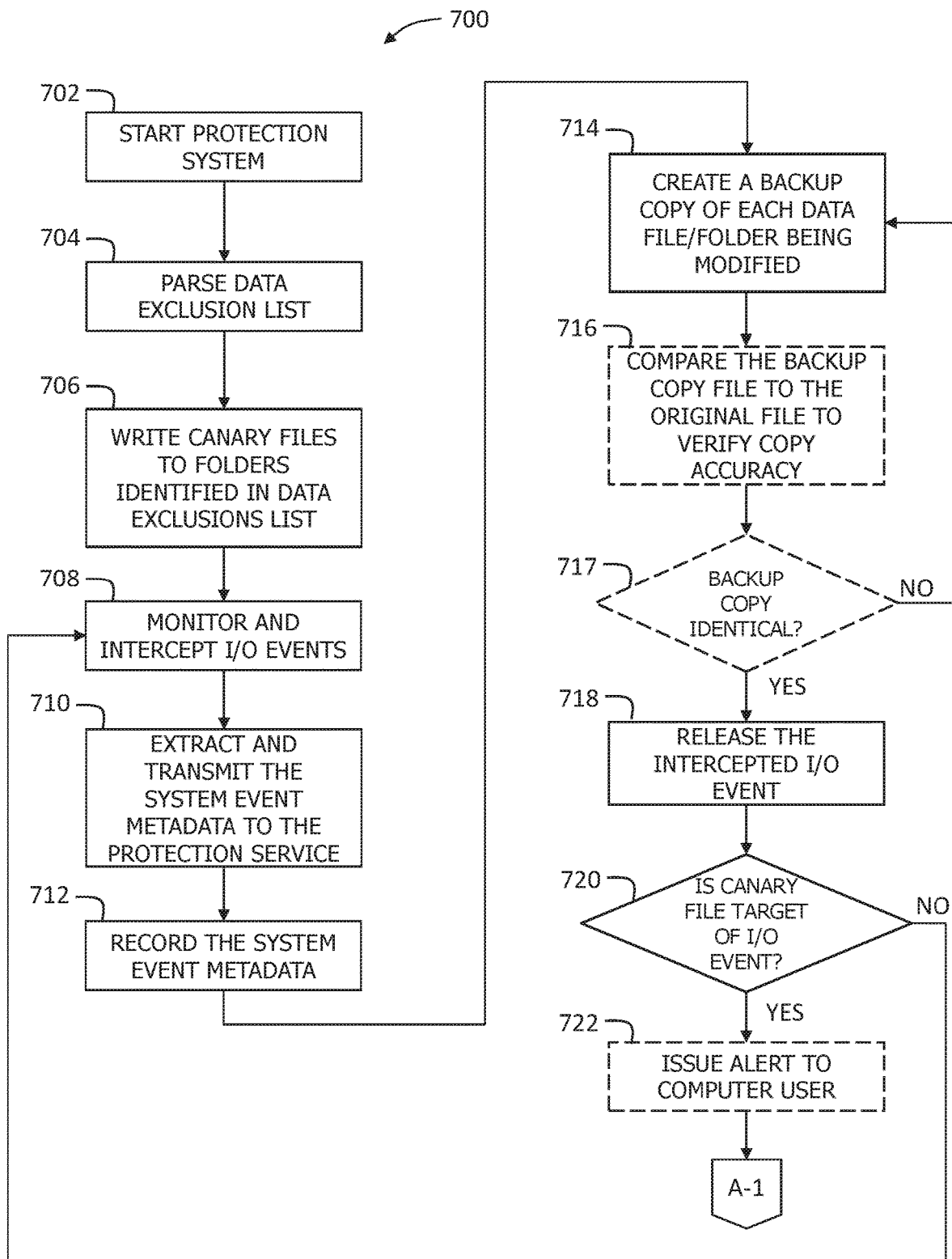
FIGS. 7A and 7B depict a flowchart illustrating a computer-implemented method for automatically protecting data against unauthorized ransomware attacks, in accordance with one embodiment of the present disclosure.
Figure 7B:
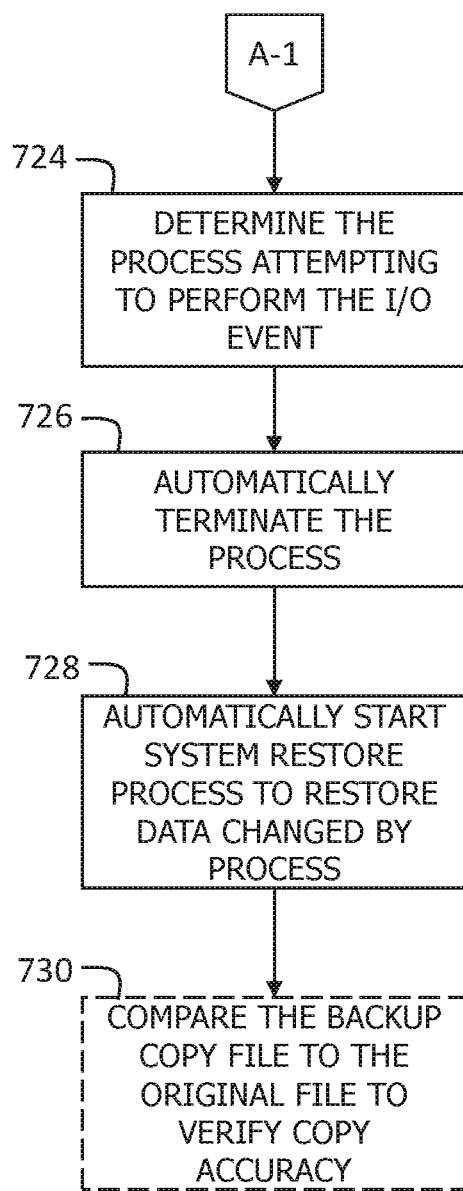

FIGS. 7A and 7B illustrate a flowchart of a computer-implemented method 700 for automatically protecting data against unauthorized ransomware attacks, in accordance with one embodiment of the present disclosure. The computer-implemented method 700 is described below, for ease of reference, as being executed by exemplary devices and components introduced with the embodiments illustrated in FIGS. 1-3. In one embodiment, the computer-implemented method 700 may be implemented by the user 108 using a computing device, such as the user computing system 100. In the exemplary embodiment, the computer-implemented method 700 relates to monitoring unauthorized data changes to data files and restoring the changed data files to an initial state, using, for example, the protection system 230.

The computer-implemented method 700 includes, at operation 702, starting the protection system 230. In particular, the filesystem minifilter driver 220 is loaded and registered with the operating system kernel 218 in the same manner as described above with reference to the method 400. In addition, the protection service 228 is started as described above with reference to the method 400.

At operation 704, the ransomware detection module 310 of the protection service 228 parses the data exclusions list 318 to identify one or more filesystem folders of the filesystem 114 that are to be excluded (i.e., excluded filesystem objects) from the system restore operation 500, described above. At operation 706, the ransomware detection module 310 writes (e.g., generates, creates, etc.) one or more canary files $118_1$-$118_n$ to each of the folders identified in the data exclusions list 318. As described herein, the canary files $118_1$-$118_n$ are dummy data files that are hidden from the user using typical filesystem attributes. The naming convention for the canary files $118_1$-$118_n$ is designed to blend in with the type of data files already stored in filesystem 114, as described above.

At operation 708, the filesystem minifilter driver 220 monitors and intercepts each I/O operation/request performed by any process, such as the processes 208, 210, or 212. At operation 710, the filesystem minifilter driver 220 transmits the system event metadata 302 (e.g., data associated with each I/O operation/request) to the protection service 228. The protection service 228 is configured to communicate directly with the filesystem minifilter driver 220, for example, to receive the system event metadata 302, which includes, for example, and without limitation, a process identifier (PID) associated with the process performing the event, a target filesystem object (i.e., file/folder) targeted by the system event, location data associated with the target filesystem object affected by the event, time and date of the event, and any other metadata associated with the event that may be used to create a snapshot of the event that enables the event to be completely reversed.

At operation 712, the protection service 228 records the system event metadata 302 in a record file 304 or other suitable recordation media (logs, tables, databases, etc.) stored in the protected storage repository 116. At operation 714, the protection service 228 automatically executes the file copy module 306 (shown in FIG. 3) to create a copy or backup of each data file/folder in which the system event metadata 302 indicates is being modified/created/deleted by a respective I/O operation/request, including the canary files $118_1$-$118_n$. In particular, the file copy module 306 writes a copy of the affected data file/folder to the protected storage repository 116 before the filesystem minifilter driver 220 releases the I/O operation/request to the underlying input/output driver (not shown) to perform the I/O operation/request on the filesystem. In one suitable embodiment, indicated by the optional operation 716, the protection service 228 may compare the copied file to the original file to verify the accuracy of the copy (i.e., that the backup copy file and the original file are substantially identical). For example, and without limitation, the protection service 228 may carry out a byte-for-byte comparison of the two files or may generate a hash value for each file and compare the hash values. At optional operation 717, if the comparison indicates that the backup copy file and the original file are substantially identical, the process continues at operation 718, otherwise, the backup copy file is deleted, and the method returns to operation 714.

At operation 718, the filesystem minifilter driver 220 releases the intercepted I/O operation/request, thereby enabling to operation to be processed or performed. That is, after recording the changes being made by the I/O operation/request, the I/O operation/request is allowed to complete. As such, the associated files/folders may be created/modified/deleted by the requesting process, such as a process 208, 210, or 212.

At operation 720, the ransomware detection module 310 of the protection service 228 determines whether one or more of the canary files $118_1$-$118_n$ are identified as target files in the system event metadata 302. If none of the canary files $118_1$-$118_n$ are identified as target files, the ransomware detection module 310 continues monitoring the system event metadata 302 at operation 708. If one or more of the canary files $118_1$-$118_n$ are identified as target files, optionally at operation 722, the ransomware detection module 310 issues an alert to the user, such as the user 108, that the protection system 230 has detected unauthorized changes (e.g., potential ransomware operating on the user computing system 100) to one or more data files/folders on the filesystem 114. The alert may be an audible and/or visual indication presented to the user on the user computing device 100. For example, and without limitation, in one suitable embodiment, the alert may consist of a text box that is displayed to the user via the user interface device 106.

When the canary files $118_1$-$118_n$ are targeted (e.g., being opened with write permissions and/or being deleted), the premise is that the suspect I/O operation/request is being performed by an unauthorized process (e.g., malicious software). At operation 724, the ransomware detection module 310 determines the process and any associated processes (child process, parent process, etc.) attempting to perform the I/O operation/request based on the system event metadata 302 (e.g., using the process identifier (PID)). At operation 726, the ransomware detection module 310 automatically terminates the identified process(es). For example, and without limitation, the ransomware detection module 310 may temporarily pause all processes executing on the user computing device 100 and/or all I/O operations and terminate the identified malicious process(es).

At operation 728, the ransomware detection module 310 starts the restore module 312, either automatically or at the command of the user 108, to restore all of the data files/folders that were modified/created/deleted by the process(es) identified as those affecting changes to the canary files $118_1$-$118_n$. In an alternative embodiment, the ransomware detection module 310 may parse the record file 304 and identify and restore all of the data files and/or folders that were modified/created/deleted within a predetermined period, for example, a period determined and/or selected by the user 108.

In one suitable embodiment, indicated by optional operation 730, the restore module 312 may compare the restored file to the backed-up file in the protected storage repository 116 to verify the accuracy of the restored file (i.e., that the backup copy file and the original file are substantially identical). For example, and without limitation, the restore module 312 may carry out a byte-for-byte comparison of the two files or may generate a hash value for each file and compare the hash values. After terminating the unauthorized process(es) and completing the restore operations, the ransomware detection module 310 releases the temporary pause on the processes executing on the user computing device 100 and/or I/O operations.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

What is claimed is:

1. A computing system comprising:
   a memory device
   the memory device comprising:
     an operating system,
     a kernel-mode file system driver configured for:
       sending and receiving a plurality of disk read/write events/requests to and from the operating system, and
       sending and receiving a plurality of input/output (I/O) events, each of the plurality of the I/O events being to or from one of a plurality of filesystem objects in a filesystem in response to a corresponding one of the plurality of disk read/write events,
     a persistent storage device having the filesystem defined therein,
     the persistent storage device comprising the plurality of filesystem objects and a protection system stored in the filesystem,
   the protection system comprising
     a filesystem minifilter driver,
     a restore service,
     a ransomware detection service
     and a protection service;
   and a processor communicatively coupled to the memory device and the persistent storage device, the processor programmed to:
     initiate the kernel-mode system driver to set a minimum access level for accessing the filesystem minifilter driver to prevent malicious disabling of the filesystem minifilter driver;
     initiate the ransomware detection service to generate and store a plurality of canary files intended not receive any of the plurality of I/O events;
     start the protection service by loading, into the memory device, the filesystem minifilter driver during a booting sequence of the computing system, the filesystem minifilter driver configured to operate in a kernel mode of the processor;
     monitor, via the filesystem minifilter driver, each of disk read/write events and each of the plurality of I/O events;
     intercept, via the filesystem minifilter driver, each of the plurality of I/O events directed to a target filesystem object of the plurality of filesystem objects;
     extract, via the filesystem minifilter driver, system event metadata from each of the plurality of I/O events, the system event metadata including an identifier of the target filesystem object;
     transmit, via the filesystem minifilter driver, the system event metadata to the protection service;
     record, via the protection service, the system event metadata in a record file when the system event meta data indicates that the target filesystem object is being changed by a corresponding I/O event;

in response to the recordation, create, via the protection service, a backup copy of the target filesystem object in a protected storage repository;

release, via the filesystem minifilter, driver, each of the intercepted I/O events, thereby enabling the each released I/O event to be performed on the target filesystem object;

monitor, by the ransomware detection service, each released I/O event sent or received to or from any of the plurality of canary files;

generate, by the ransomware detection service, a trigger in response to the monitoring;

in response to the trigger, perform a system restore operation comprising:

parsing a white list and a data exclusion list to identify user accounts, processes, files, and folders to be excluded from the system resort operation;

determining one or more processes that sent the each released I/O event sent or received to or from any of the plurality of canary files, determining one or more parent and child processes associated the determined one or more processes, terminating the determined one or more processes and the determined one or more parent and child processes, pausing all un-terminated processes, parsing the record to identify changes to the filesystem to be undone(undo) by reading the recorded system event metadata, performing the undo on a plurality of files and folders not including files and folders contained in the data exclusion list and corresponding to the identified changes comprising:

deleting files added,
deleting folders added,
restoring files deleted,
restoring folders deleted, and
replacing changed files with a corresponding copy corresponding to the changed file before the changed file was changed;

whereby the system restore operation operates on a number of file backup copies less than a number of all files to reduce the negative impact on computing system performance as compared to a different system restore operation that operates on the number of all files.

2. The computing system in accordance with claim 1, said processor further programmed to monitor, via the filesystem minifilter driver, I/O events directed to one or more of the plurality of filesystem objects.

3. The computing system in accordance with claim 1, said processor further programmed to register the filesystem minifilter driver with an operating system kernel.

4. The computing system in accordance with claim 1, said processor further programmed to start the protection service, the protection service configured to operate in a user mode of the processor.

5. The computing system in accordance with claim 1, said processor further programmed to compare the backup copy to the target filesystem object to determine whether the backup copy and the target filesystem object are substantially identical.

6. The computing system in accordance with claim 5, wherein the compare operation comprises one or more of the following:

said processor programmed to carry out a byte-for-byte comparison of the backup copy to the target filesystem object; and said processor programmed to generate a first hash value for the backup copy and a second hash value for the target filesystem object and compare the first and second hash values.

7. The computing system in accordance with claim 1, said processor further programmed to:

determine whether the system restore operation has been requested; and if the system restore operation has been requested, start, via the protection service, the system restore operation.

8. A method performed by a computing system having a memory device the memory device comprising:
an operating system,
a kernel-mode file system driver configured for:
sending and receiving a plurality of disk read/write events/requests to and from the operating system, and
sending and receiving a plurality of input/output (I/O) events, each of the plurality of the I/O events being to or from one of a plurality of filesystem objects in a filesystem in response to a corresponding one of the plurality of disk read/write events,
a persistent storage device having the filesystem defined therein,
the persistent storage device comprising the plurality of filesystem objects and a protection system stored in the filesystem,
the protection system comprising
a filesystem minifilter driver,
a restore service,
a ransomware detection service
and a protection service;
and a processor,
the method comprising:
initiating the kernel-mode system driver to set a minimum access level for accessing the filesystem minifilter driver to prevent malicious disabling of the filesystem minifilter driver;
initiating the ransomware detection service to generate and store a plurality of canary files intended not receive any of the plurality of I/O events;
starting the protection service by loading, into the memory device, the filesystem minifilter driver during a booting sequence of the computing system, the filesystem minifilter driver configured to operate in a kernel mode of the processor;
monitoring, via the filesystem minifilter, driver, each of disk read/write events and each of the plurality of I/O events;
intercepting, via the filesystem minifilter, driver, each of the plurality of I/O events directed to a target filesystem object of the plurality of filesystem objects;
extracting, via the filesystem minifilter driver, system event metadata from each of the plurality of I/O events, the system event metadata including an identifier of the target filesystem object;
transmitting, via the filesystem minifilter driver, the system event metadata to the protection service;
recording, via the protection service, the system event metadata in a record file when the system event metadata indicates that the target filesystem object is being changed by a corresponding I/O event;

in response to the recording, creating, via the protection service, a backup copy of the target filesystem object in a protected storage repository;

releasing, via the filesystem minifilter, driver, each of the intercepted I/O events,
thereby enabling the each released I/O event to the performed on the target filesystem object;

monitoring, by the ransomware detection service, each released I/O event sent or received to or from any of the plurality of canary files;

generating, by the ransomware detection service, a trigger in response to the monitoring;

in response to the trigger, performing a system restore operation comprising:
parsing a white list and a data exclusion list to identify user accounts, processes, files, and folders to be excluded from the system resort operation;
determining one or more processes that sent the each released I/O event sent or received to or from any of the plurality of canary files,
determining one or more parent and child processes associated the determined one or more processes,
terminating the determined one or more processes and the determined one or more parent and child processes,
pausing all un-terminated processes,
parsing the record to identify changes to the filesystem to be undone(undo) by reading the recorded system event metadata,
performing the undo on a plurality of files and folders not including files and folders contained in the data exclusion list and corresponding to the identified changes comprising:
deleting files added,
deleting folders added,
restoring files deleted,
restoring folders deleted, and
replacing changed files with a corresponding copy corresponding to the changed file before the changed file was changed;
whereby the system restore operation operates on a number of file backup copies less than a number of all files to reduce the negative impact on computing system performance as compared to a different system restore operation that operates on the number of all files.

9. The method in accordance with claim 8,
said method further comprising:
setting, via the operating system kernel, a minimum access level for accessing the filesystem minifilter driver; and
registering the filesystem minifilter driver with the operating system kernel.

10. The method in accordance with claim 8, wherein said setting a minimum access level operation comprises:
setting a parameter of the operating system kernel to prevent access to the filesystem minifilter driver by one or more predetermined user accounts; and
requiring user authentication for one or more authorized user accounts.

11. The method in accordance with claim 8,
said method further comprising starting the protection service, wherein the protection service is configured to operate in a user mode of the computing system.

12. The method in accordance with claim 8,
said method further comprising comparing the backup copy to the target filesystem object to determine whether the backup copy and the target filesystem object are substantially identical.

13. The method in accordance with claim 12, wherein the comparing operation comprises one or more of the following:
carrying out a byte-for-byte comparison of the backup copy to the target filesystem object; and
generating a first hash value for the backup copy and a second hash value for the target filesystem object and comparing the first and second hash values.

14. The method in accordance with claim 13,
said method further comprising:
based upon the comparison, deleting the backup copy if the backup copy and the target filesystem object are not substantially identical; and
creating, via the protection service, a second backup copy of the target filesystem object.

15. The method in accordance with claim 8, said method further comprising:
determining whether the system restore operation has been requested; and
if the system restore operation has been requested, starting, via the protection service, the system restore operation.

16. The method in accordance with claim 15, wherein starting the system restore operation comprises starting a restore module of the protection service, and wherein the replacing operation comprises:
starting a restore module of the protection service;
parsing the record file, using the restore module, to read the system event metadata recorded in the record file, including the identifier;
determining, using the restore module, from the identifier that the I/O event was directed to the target filesystem object;
determining, using the restore module, that the I/O event was unauthorized; and
replacing, using the restore module, the target filesystem object with the backup copy.

17. The method in accordance with claim 8, wherein the replacing operation comprises:
starting a restore module of the protection service;
parsing the record file, using the restore module, to read the system event metadata recorded in the record file;
determining, using the restore module, from the system event metadata that the I/O event was performed on the target filesystem object;
determining, using the restore module, that the I/O event was unauthorized; and
replacing, using the restore module, the target filesystem object with the backup copy.

18. The method in accordance with claim 8, wherein the monitoring operation comprises receiving one or more Pre-Operation callbacks associated with the I/O event directed to the target filesystem object.

\* \* \* \* \*